(12) United States Patent
Blumenau et al.

(10) Patent No.: US 7,546,482 B2
(45) Date of Patent: Jun. 9, 2009

(54) METHOD AND APPARATUS FOR MONITORING THE STORAGE OF DATA IN A COMPUTER SYSTEM

(75) Inventors: Steven M. Blumenau, Holliston, MA (US); Michel Fisher, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 848 days.

(21) Appl. No.: 10/281,524

(22) Filed: Oct. 28, 2002

(65) Prior Publication Data

US 2004/0080558 A1    Apr. 29, 2004

(51) Int. Cl.
G06F 11/00 (2006.01)
G06F 11/07 (2006.01)
G06F 11/08 (2006.01)
G06F 11/16 (2006.01)
G06F 11/30 (2006.01)

(52) U.S. Cl. ............ 714/5; 714/2; 714/6; 714/7; 714/54; 714/758; 710/15; 710/18; 710/19

(58) Field of Classification Search ............... None
See application file for complete search history.

(56) References Cited

U.S. PATENT DOCUMENTS

| | | | |
|---|---|---|---|
| 5,247,692 A * | 9/1993 | Fujimura ............... 707/200 |
| 5,504,861 A * | 4/1996 | Crockett et al. ............ 714/13 |
| 5,544,347 A | 8/1996 | Yanai et al. |
| 5,548,711 A | 8/1996 | Brant et al. |
| 5,615,329 A * | 3/1997 | Kern et al. ............... 714/6 |
| 5,680,640 A | 10/1997 | Ofek et al. |
| 5,692,155 A * | 11/1997 | Iskiyan et al. ............ 711/162 |
| 5,742,792 A | 4/1998 | Yanai et al. |
| 5,822,531 A | 10/1998 | Gorczyca et al. |
| 5,870,545 A | 2/1999 | Davis et al. |
| 5,896,548 A | 4/1999 | Ofek |
| 6,058,054 A | 5/2000 | Islam et al. |
| 6,065,077 A | 5/2000 | Fu |
| 6,078,990 A | 6/2000 | Frazier |

(Continued)

FOREIGN PATENT DOCUMENTS

WO    WO 01/98889    12/2001

(Continued)

OTHER PUBLICATIONS

Blunden M., et al., Storage Networking Virtualization What's it all about, Dec. 2000 IBM Redbooks.

(Continued)

Primary Examiner—Tanh Q Nguyen
(74) Attorney, Agent, or Firm—Krishnendu Gupta; Robert Kevin Perkins

(57) ABSTRACT

One aspect is directed to a method for storing, in a persistent manner, a state of the storage process such that the state of the storage operation may be recovered if the storage operation is interrupted. Another aspect is directed to a method and apparatus that stores the state of a storage operation in a non-volatile memory of a computer that stores data on a storage system. Another aspect is directed to a method for recovering the state of the storage process without having to re-perform storage operations. Another aspect is directed to maintaining state information for other purposes such as monitoring access to data storage locations.

18 Claims, 11 Drawing Sheets

U.S. PATENT DOCUMENTS

| | | | |
|---|---|---|---|
| 6,108,748 A | 8/2000 | Ofek et al. | |
| 6,145,066 A | 11/2000 | Atkin | |
| 6,148,383 A * | 11/2000 | Micka et al. | 711/162 |
| 6,161,218 A | 12/2000 | Taylor | |
| 6,173,377 B1 | 1/2001 | Yanai et al. | |
| 6,199,074 B1 * | 3/2001 | Kern et al. | 707/204 |
| 6,216,202 B1 | 4/2001 | D'Errico | |
| 6,233,607 B1 | 5/2001 | Taylor et al. | |
| 6,240,486 B1 | 5/2001 | Ofek et al. | |
| 6,266,784 B1 | 7/2001 | Hsiao et al. | |
| 6,301,643 B1 * | 10/2001 | Crockett et al. | 711/162 |
| 6,356,977 B2 | 3/2002 | Ofek et al. | |
| 6,367,075 B1 | 4/2002 | Kruger et al. | |
| 6,370,626 B1 | 4/2002 | Gagne et al. | |
| 6,434,637 B1 | 8/2002 | D'Errico | |
| 6,480,970 B1 * | 11/2002 | DeKoning et al. | 714/6 |
| 6,523,036 B1 | 2/2003 | Hickman et al. | |
| 6,539,462 B1 * | 3/2003 | Mikkelsen et al. | 711/162 |
| 6,542,909 B1 | 4/2003 | Tamer et al. | |
| 6,564,336 B1 | 5/2003 | Majkowski | |
| 6,598,134 B2 | 7/2003 | Ofek et al. | |
| 6,631,477 B1 | 10/2003 | LeCrone et al. | |
| 6,636,984 B1 * | 10/2003 | McBrearty et al. | 714/6 |
| 6,640,278 B1 | 10/2003 | Nolan et al. | |
| 6,665,812 B1 | 12/2003 | Blumenau et al. | |
| 6,691,245 B1 | 2/2004 | DeKoning | |
| 6,704,838 B2 | 3/2004 | Anderson | |
| 6,745,303 B2 * | 6/2004 | Watanabe | 711/161 |
| 6,751,636 B1 * | 6/2004 | Mende et al. | 707/200 |
| 6,760,828 B1 | 7/2004 | Black | |
| 6,832,289 B2 * | 12/2004 | Johnson | 711/112 |
| 6,874,046 B1 | 3/2005 | LeCrone et al. | |
| 2002/0052941 A1 | 5/2002 | Patterson | |
| 2002/0056031 A1 | 5/2002 | Skiba et al. | |
| 2002/0133737 A1 | 9/2002 | Novick | |
| 2002/0133746 A1 | 9/2002 | Chen et al. | |
| 2003/0009707 A1 | 1/2003 | Pedone et al. | |
| 2003/0014523 A1 | 1/2003 | Teloh et al. | |
| 2003/0115434 A1 | 6/2003 | Mahalingam et al. | |
| 2003/0188218 A1 | 10/2003 | Lubbers et al. | |
| 2003/0217119 A1 | 11/2003 | Raman et al. | |
| 2003/0229764 A1 | 12/2003 | Ohno et al. | |
| 2004/0024961 A1 * | 2/2004 | Cochran et al. | 711/112 |
| 2004/0024975 A1 | 2/2004 | Morishita et al. | |
| 2004/0034628 A1 | 2/2004 | Numao et al. | |
| 2004/0139237 A1 | 7/2004 | Rangan et al. | |
| 2004/0215845 A1 | 10/2004 | Davani et al. | |

FOREIGN PATENT DOCUMENTS

| | | |
|---|---|---|
| WO | WO 02/03203 | 1/2002 |

OTHER PUBLICATIONS

Khattar R., "Introduction to Storage Area Network, SAN", Aug. 1999, IBM.

The American College Dictionary, Copyright 2002, Houghton Mifflin Company Fourth Edition, p. 1038.

Pabst, Thomas, "Fast and inexpensive—Promise's FastTrak66 IDE RAID-Controller." Mar. 29, 2000. Tom's Hardware http://.tomshardware.com/storage/20000329/fastrak66-02.html>.

Patterson, David A. et al. "A Case for Redundant Arrays of Inexpensive Disks (RAID)", ACM 0-89791-268-3/88/0006/0109, 1998, pp. 109-116.

"Promise Milestone." 2005 http://www.promise.com/company/about/prms_milestone_eng.asp.

"Redundant array of independent disks." Wikipedia: The Free Encyclopedia. Nov. 10, 2005 <http://en.wikipedia.org/wiki/Redundant_array_of_inexpensive_disks>.

* cited by examiner

| State No. | State of Write or Interruption | Comments |
|---|---|---|
| 1 | Write is not performed on either $V_1$ or $V_2$ | OK |
| 2 | Write is performed on $V_1$, but not $V_2$ | Undesirable State |
| 3 | Write is performed on $V_2$, but not $V_1$ | Undesirable State |
| 4 | Write is performed on both $V_1$ and $V_2$ | OK |

Figure 9

METHOD AND APPARATUS FOR MONITORING THE STORAGE OF DATA IN A COMPUTER SYSTEM

FIELD OF THE INVENTION

The present invention relates generally to the storage of data in a computer system.

DESCRIPTION OF THE RELATED ART

Storage systems generally include storage devices (e.g., disks) to store applications, application data, user data, and the like in a computer system. These storage systems are accessed by hosts for the purposes of storing, retrieving, or performing operations with data stored in the storage systems.

Hosts that access such information may be, for example, servers that provide resources (e.g., data storage, email, and other services), clients (e.g., general-purpose computer systems operated by users), network components (e.g., switches) or other types of systems. Hosts are generally coupled by a communication medium (e.g., a network) to a data storage system for the purpose of storing applications and their data. Examples of communication media that can be used to form such a configuration include dedicated links (e.g., ESCON or SCSI) and networks such as Fibre Channel, Ethernet and ATM, among others.

Hosts typically perform one or more data storage operations involving a storage system. Such operations may include, for example, writes, reads, mirroring, migration, data backup, data recovery, or other operations. These operations involve one or more hardware and/or software systems (e.g., the host, storage system, network components, etc.) that may fail during the operation.

Failure during a data storage operation may result in the loss of data and lost time and effort in restoring a good state of data. Frequently, applications that perform such data storage operations must restart from the beginning, wasting valuable resources in placing the application and/or its data in a known state. For example, in the case of a data migration process where data is migrated between source and target storage volumes, if the migration operation is interrupted, a user performing the data migration operation may have to restart the migration from the beginning. For large migrations, there is much lost time, effort, and money associated with restarting the migration process.

SUMMARY OF THE INVENTION

One illustrative embodiment of the invention is directed to a method for use in a computer system including at least one computer and at least one storage system that is coupled to the at least one computer to store data written thereby. The method comprises acts of performing, by the at least one computer, at least one storage operation on a first storage location in the at least one storage system, and storing, in a non-volatile memory of the at least one computer, information identifying a state of the at least one storage operation performed by the at least one computer.

Another illustrative embodiment is directed to a method for recovering a state of at least one storage process in a computer system including at least one storage system that stores data written by at least one computer in the computer system, the storage process including a write operation that writes the same data to first and second data storage locations in the at least one storage system, the storage process being interrupted during the write operation. The method comprises acts of determining whether data stored in the first data storage location and the second data storage location is consistent; and resuming the at least one storage process in response to the act of determining.

A further illustrative embodiment is directed to a computer readable medium encoded with instructions for execution on a computer system, the instructions when executed, perform a method for storing data in a system including at least one computer and at least one storage system that stores data written by an application executed in the at least one computer. The method comprises acts of performing, by the at least one computer, at least one storage operation on a first storage location in the at least one storage system; and storing, in a non-volatile memory of the at least one computer, information identifying a state of the at least one storage operation performed by the at least one computer.

Another illustrative embodiment is directed to a computer readable medium encoded with instructions for execution on a computer system, the instructions, when executed, perform a method for recovering a state of at least one storage process in a computer system including at least one storage system that stores data written by at least one computer in the computer system, the storage process including a write operation that writes the same data to first and second data storage locations in the at least one storage system, the storage process being interrupted during the write operation. The method comprises acts of determining whether data stored in the first data storage location and the second data storage location is consistent; and resuming the at least one storage process in response to the act of determining.

Another illustrative embodiment is directed to a method for monitoring storage of data in a computer system including at least one computer and at least one storage system that stores data in response to at least one data storage operation executed by the at least one computer. The method comprises an act of maintaining, for at least one data storage location of the at least one storage system, a count of a number of input/output (I/O) operations performed on the at least one data storage location.

A further illustrative embodiment is directed to a method for monitoring storage of data in a computer system including at least one computer and at least one storage system that stores data in response to at least one data storage operation executed by the at least one computer. The method comprises an act of maintaining, for at least one data storage location of the at least one storage system, at least one timestamp that identifies a time at which at least one data storage operation was performed on the at least one data storage location.

Another illustrative embodiment is directed to a method for monitoring storage of data in a computer system including at least one computer and at least one storage system that stores data in response to at least one data storage operation executed by the at least one computer. The method comprises acts of creating a first set of state information that identifies one or more accesses to a storage location of the storage system, storing the first set of state information in a non-volatile memory location, and, upon a failure of the computer system, recovering a state of an application based on the first set of state information.

Another illustrative embodiment is directed to a computer readable medium encoded with instructions for execution in a computer system, the instructions when executed, perform a method for monitoring storage of data in a computer system including at least one computer and at least one storage system that stores data in response to at least one data storage operation executed by the at least one computer. The method comprises acts of maintaining, for at least one data storage location of the at least one storage system, a count of a number of input/output (I/O) operations performed on the at least one data storage location.

A further illustrative embodiment is directed to a computer readable medium encoded with instructions for execution in a computer system, the instructions when executed, perform a method for monitoring storage of data in a computer system including at least one computer and at least one storage system that stores data in response to at least one data storage operation executed by the at least one computer. The method comprises an act of maintaining, for at least one data storage location of the at least one storage system, at least one timestamp that identifies a time at which at least one data storage operation was performed on the at least one data storage location.

A further illustrative embodiment is directed to a computer readable medium encoded with instructions for execution in a computer system, the instructions when executed, perform a method for monitoring storage of data in a computer system including at least one computer and at least one storage system that stores data in response to at least one data storage operation executed by the at least one computer. The method comprises acts of creating a first set of state information that identifies one or more accesses to a storage location of the storage system, storing the first set of state information in a non-volatile memory location, and, upon a failure of the computer system, recovering a state of an application based on the first set of state information.

BRIEF DESCRIPTION OF THE DRAWINGS

In the drawings, like reference numerals indicate like or functionally similar elements. Additionally, the left-most one or two digits of a reference numeral identifies the drawing in which the reference numeral first appears.

FIG. 9 is a table showing possible write states as a result of an interruption of a software mirroring operation;

DETAILED DESCRIPTION

One embodiment of the invention is directed to a method for performing a process involving one or more storage operations and storing, in a persistent manner, a state of the process such that the state of the process may be recovered if the process is interrupted. In conventional computer systems, there is no ability to recover the state of an interrupted storage process. An interruption may result from, for example, a loss of power of the host computer system performing the storage process, a crash of one or more entities involved in the storage process, loss of network communication, or other failure that causes a loss of state information or otherwise prohibits the storage process from continuing.

According to one embodiment of the invention, a technique is provided for recovering the state of the process without having to re-perform operations that completed successfully before the interruption, thereby reducing the overall number of operations needed to be performed during recovery.

According to another embodiment of the invention, state information associated with a data storage process is stored in a persistent manner, such that the state of the data storage process may be recovered in case of an interruption.

Figure 1:
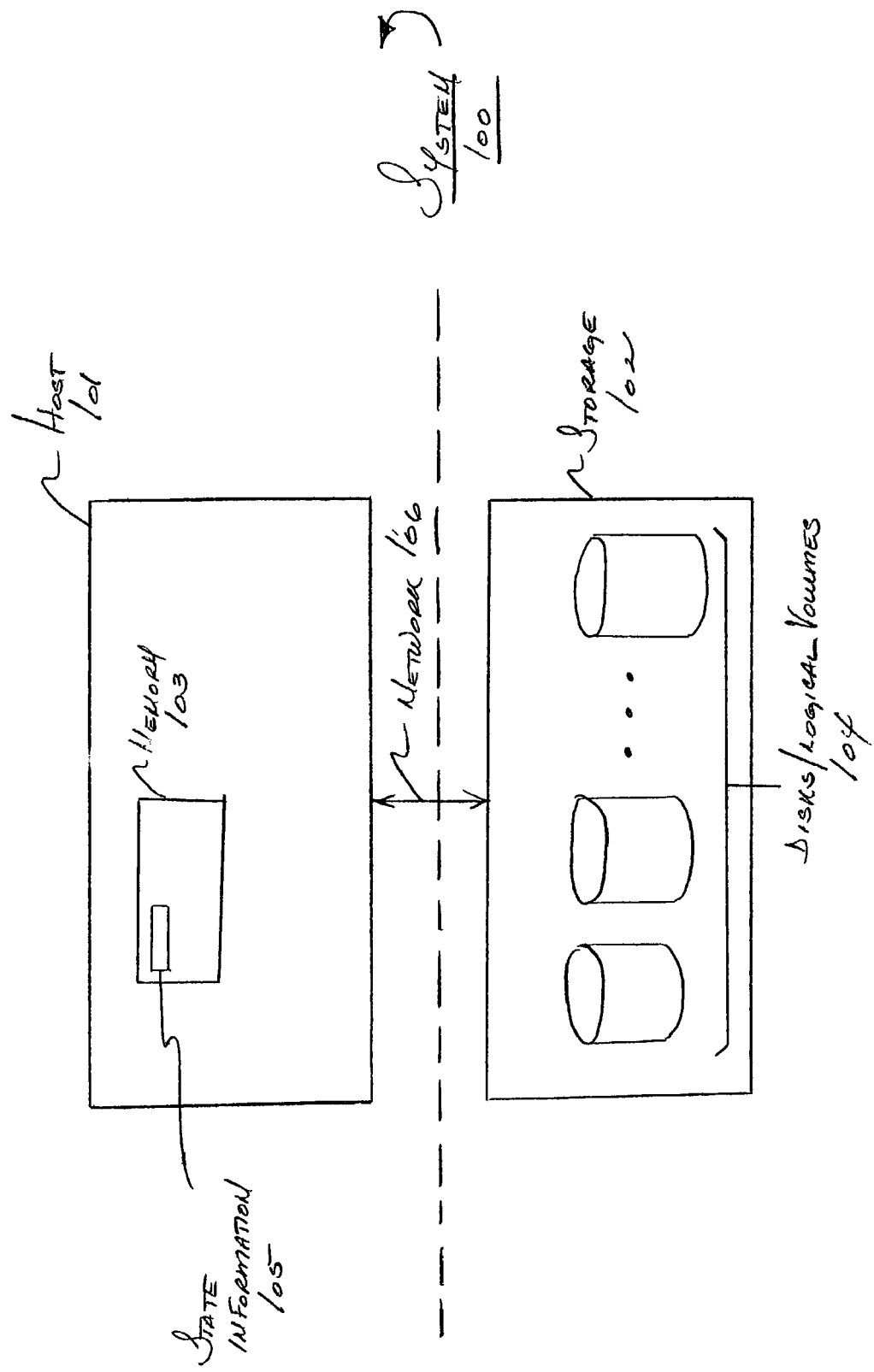
FIG. 1 shows a block diagram of a computer system suitable for incorporation of various aspects of the invention.

The data storage process may be performed by a host computer 101 (FIG. 1), which may be, for example, any computer system having a processor that executes a program capable of performing the data storage process (e.g., a general-purpose computer, a server, client, communication device such as a switch or router, or any other type of computer system). The data storage process for which state information is stored may be, for example, a backup, copy, recovery, migration or any other type of process involving data storage operations. The data storage operations may be directed to, for example, one or more disks/logical volumes 104 of a storage system 102. Disks/logical volumes 104 may be, for example, one or more physical and/or logical units of storage upon which data may be stored. The data storage operations may be performed, for example, over any suitable communication medium (e.g., network 106) that couples host 101 to a storage system 102.

In one aspect of the invention, state information 105 is stored in a non-volatile data storage location accessible to host 101. State information 105 may be stored, for example, by hardware, software, or combination thereof residing on host 101. According to one embodiment of the invention, host 101 executes a program that allows it to store the state information 105 that stores a state of a storage process. This can be performed in numerous ways. According to one embodiment of the invention discussed below, the program is executed by, and operates in, an I/O (input/output) stack of the host 101 on which the storage process executes.

In one embodiment, the non-volatile data storage location where state information 105 is stored may be, for example, in a non-volatile random access memory (NVRAM) device located within host 101. Typically, NVRAM is used in a host to store configuration information (e.g., boot information, processor and/or server configuration information). According to one aspect of the invention, a portion of non-volatile RAM is used to maintain the state of a data storage process. By storing process state information in NVRAM, state may be recovered upon interruption, even if the interruption results from a loss of power to the host. Although it is shown by way of example that the state of a storage process may be stored in NVRAM, it should be appreciated that the state information may be stored in any persistent storage location. Also, it should be understood that the state information need not be stored in host 101; state information may be stored in other locations (e.g., storage system 102), as the invention is not limited to storing process state information in any particular location or in any particular manner.

In one embodiment, state information 105 provides an indication of the status of input/output (I/O) operations performed on one or more storage locations of storage system 102. This can be done in any of numerous ways. In one embodiment of the invention, information is used that identifies state changes of the storage locations, and one embodiment employs a technique that expands upon an existing method for indicating a state of change of data storage locations. An example of such an existing technique for identifying a state change is illustrated in FIG. 2.

Figure 2:
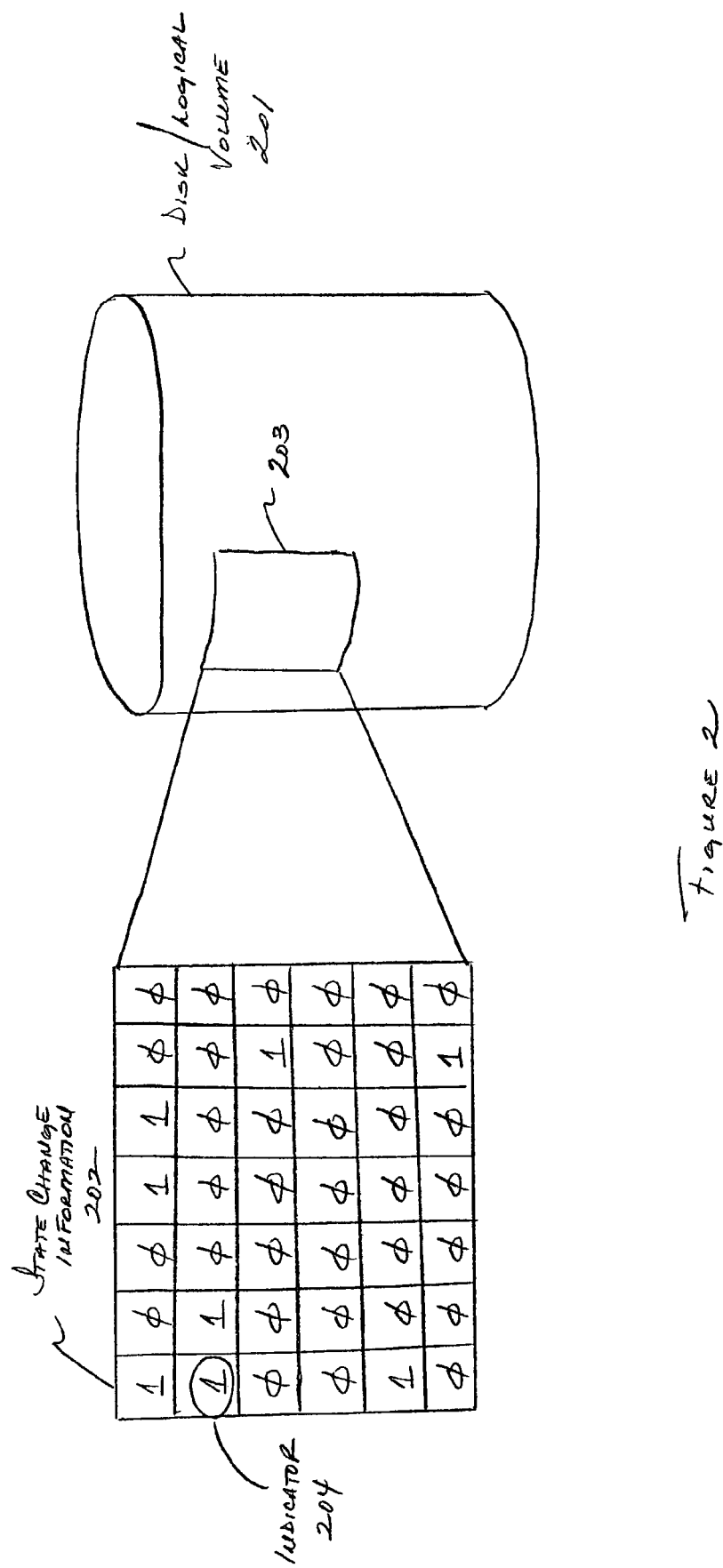
FIG. 2 shows a conventional bitmap that stores change information for volumes of storage in a storage system.

In the example shown in FIG. 2, state change information 202 is stored for a disk/logical volume 201 associated with a storage system. A volume is a storage resource into which a file system, database management system (DBMS) or other application can store data. A volume can correspond to a physical storage device (e.g., a disk drive) within the storage system, or may correspond to a virtual storage location (e.g., in the case where the storage system is an intelligent storage system that performs a mapping between virtual storage locations and physical storage located on one or more media).

When a write is performed on one or more portions of data 203 of volume 201, an indicator is updated in state change information 202. This information is a bit which indicates that a change has been made to the data stored in a corresponding storage location of volume 201. For instance, when the data stored in one or more corresponding data locations of volume 201 have been written to, an indicator 204 is modified to indicate that a change has been made at the corresponding location. More particularly, there may be a bit that tracks the state of data stored in a corresponding data storage location of volume 201. When data is updated at this location, indicator 204 is changed to indicate that the data has been updated. State change information 202 may be stored as a set of bitmap information located on volume 201. An example of a product that employs such state change information 202 is the commercially-available DELTAMARK control program of the SymmAPI-Control Application Programming Interface (API) available from the EMC Corporation, Hopkinton, Mass. The SymmAPI-Control API includes a library of programs that perform, for example, configuration, business continuity, and performance functions for use with the Symmetrix storage systems available from the EMC Corporation.

The DELTAMARK control program maintains, on the storage system (e.g., on the Symmetrix storage system), a state indicator that identifies data that has changed since a specified time. The state indicator is stored in the form of a bitmap that includes a number of bits, each of which tracks whether data has changed in a corresponding data storage location. For example, the bitmap can be employed to identify changed locations to perform an incremental backup. Thus, the bitmap is initialized after the backup is completed, and only updated data identified by the state information needs to be backed-up at a later time, thereby reducing resources needed to perform the backup operations.

Applicants have appreciated that for certain types of processes including multiple data storage operations, it is desirable to employ state information that provides more information than the technique shown in FIG. 2. One such process that can benefit from the use of such additional information is an online data migration process.

During an online migration of data from a first volume (a source volume) to a second volume (a target volume), an interruption may occur while one or more write operations to be applied to both the source and target volumes are pending. To recover from such an interruption, generally, a process seeks to determine the state of the pending write operations when failure occurred.

An online migration may include two processes: a copy process that copies data from the source volume to the target volume, and a mirroring process that applies any writes to the source volumes during the migration to both the source and target volumes to insure consistency between the source and target volumes at the completion of the migration.

In view of the fact that the source volume(s) are maintained online during the migration, there is a risk that the system might crash while one or more write I/O operations were pending. In one embodiment of the invention, a technique is employed to handle a crash that occurs while performing a migration and while one or more I/O write operations are pending. As shown in table 900 of FIG. 9, there are four possible states in which a write operation to be applied to two locations could possibly be when the system crashed.

In a first state (state 1), the write operation has not been performed successfully on either the source volume (V1) or the target volume (V2). This state is not problematic, as the source (V1) and target (V2) volumes are consistent, such that the migration is not at risk of being performed inaccurately. It is entirely within the control of the application program that issued the outstanding write requests to recover from the crash. The application will not have received an acknowledgment that the write completed, and most applications will reissue the write request after recovery from the crash. For example, in the case of a database management server (DBMS, e.g., an Oracle DBMS available from the Oracle Corporation, Redwood Shores, Calif.), the DBMS will keep a queue of I/O operations and their status (e.g., pending, completed). If an operation is not completed within a certain amount of time, the DBMS will reissue the request.

In a second state (state 2), the write is completed to the source volume, but not to the target volume. This state is potentially problematic, as the source and target volumes are inconsistent. In particular, if the write is acknowledged to the application as completed, the application will not reissue the write request. If the write was directed to a portion already migrated (e.g., a write operation is performed on data already copied to the second volume), the newly written data would be "lost" as the data would never be updated to the target volume. This could cause serious problems when the migration was completed and a switch was made to the target data set.

In a third state (state 3), the write is completed to the target volume, but not to the source volume. This state is undesirable also, because it results in the target volume not being an accurate copy of the source.

In a fourth state (state 4), the write operation is performed on both the source and target volumes. This state is not problematic because the volumes are consistent, and recovery is entirely dependent on the application that issued the write request. If the write operation was acknowledged to the application, the application would likely not reissue it. If the crash occurred before write operation was acknowledged, the write operation may be reissued by the application.

One embodiment of the invention is directed to a migration operation that avoids or resolves undesirable states 2 and 3 discussed above to ensure recovery under all conditions when the migration is interrupted, by taking two actions. First, when a write request is issued to the source volume(s), it is not acknowledged to the application as completed unless and until the data has been successfully written to both the source and target volumes. Thus, from the perspective of the application, the write request will either have completed or not. If the write is acknowledged, then state 4 (of FIG. 9) is achieved which is not problematic as discussed above. If the write is not acknowledged, then any of states 1-3 may have been achieved, and it is expected that the application that issued the write request will seek to recover.

An application seeking to recover from a failed write request may perform a read operation to see if the write data made it to its destination. If the system was in state 2 (FIG. 9) with good data located on the source but not the target, the application might not reissue the write, as it would perceive it as unnecessary. Because the migration is transparent to the application, and the application will not check the target volume to avoid inconsistency, the second action performed in accordance with one embodiment of the invention is to determine whether the source and target volumes store consistent data, and when they do not, take action to make them consistent. Thus, after the recovery actions by the application are completed, the source and target volumes will store consistent data.

According to one aspect of the invention, both undesirable states 2 and 3 may be eliminated by a recovery process that determines whether the source and target data is consistent, and when it is not, takes action to make the data consistent. This can be done, for example, by copying good data from the location where the pending write operation completed successfully to the other data storage location. For instance, to recover from an interrupted migration, a comparison can be made between state information of corresponding data storage locations of the source and target volumes. This comparison may be made, for example, by a program executing on host 101 (e.g., the migration program or other program), or in any other suitable manner. If, after the comparison, it is determined that a more recent write operation was performed to either of the source or target data storage locations, the data stored in that particular data storage location may be relied upon as good data. The good data may be copied to the other data storage location to make the data stored at the source and target data storage locations consistent. According to another aspect of the invention, rather than copying the good data from one location to the other, the source and target storage locations may be made consistent by invalidating the data stored at both locations.

As discussed above, according to one embodiment of the invention, state information that expands upon (i.e., is more detailed than) the technique shown in FIG. 2 may be used to track the state of write operations performed on the data, and can be used to determine whether the source and target volumes have consistent data, and if not, which has the more recent data. More particularly, state information 202 (i.e., a simple bitmap) is insufficient for determining the state of any but a first write operation to a storage location. For instance, after a first write operation is applied to a particular storage location of the source, the bitmap will indicate that the location has been updated. If a failure occurs while a second write operation is pending to the same storage location, the value of the single bit will not change irrespective of whether the second write operation completes successfully, so that the single bit is insufficient for indicating whether subsequent write operations were successfully applied. Thus, in the case of a mirroring operation where writes are applied to both a source and target location, a simple bitmap is insufficient to determine consistency between data stored at the source and target locations.

Figure 3:
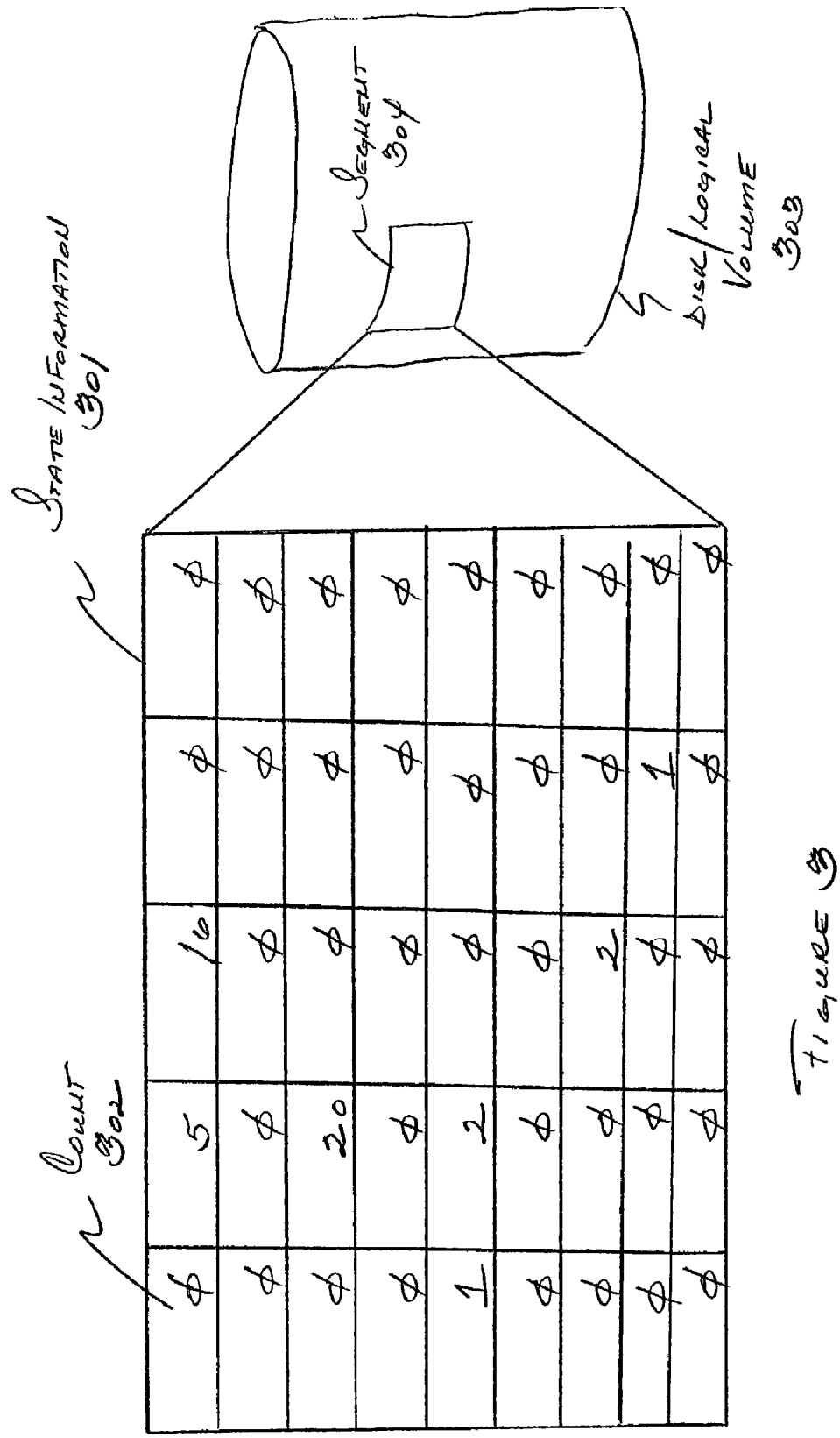
FIG. 3 shows a technique for storing state information for a storage volume.

According to one aspect of the invention, a technique is provided for storing and recovering a state of a data storage process, and may be used to determine the state (e.g., successfully completed or not) of a single data storage operation. According to one embodiment of the invention shown in FIG. 3, state information 301 may be stored that can be used to recover a state of a storage operation. In particular, state information 301 may include an indicator which can be used later to identify whether a particular storage operation was performed on a particular location on a disk/logical volume 303. In particular, state information 301 may track storage operations performed on a data segment 304 of disk/logical volume 303. Segment 304 may be, for example, a subpart of volume 303 (e.g., a data block, group of data blocks, a track, or any other portion of data).

State information 301 may include one or more fields that each tracks the state of a storage element (i.e., a unit of storage) of disk/logical volume 303. In one embodiment, state information 301 may include a count 302 which indicates a number of data operations performed on the corresponding storage element of volume 303. In contrast to the use of a single bit of state information (e.g., state information 202 of FIG. 2) that indicates only whether data has changed since a reference point in time, a count of data operations allows an application to determine how many data operations were performed on a particular storage location, which can be used advantageously in numerous ways.

In one embodiment, a single count can be maintained for multiple types of operations (e.g., reads and writes), a single count can be maintained for a specific type of operation (e.g., reads or writes), or multiple counts can be employed to separately count different types of operations. For example, in the case where a count is maintained for the number of write operations performed on a particular storage element, the count can be incremented (or decremented) on each write operation so that a program may be able to determine how many write operations were applied to the particular storage element since a particular reference point in time.

For example, in the case where data is mirrored to two separate volumes (e.g., as part of an online migration as discussed above), and it is unknown whether data stored on those volumes (e.g., the source and target volumes in the migration example above) is consistent, counts associated with each of the data storage locations on the respective volumes may be compared to determine whether the volumes contain consistent data, and if not, which volume contains the most updated information. For example, in the case where counts associated with each of the data storage locations are incremented, the data storage location having a higher corresponding count holds the more recent data.

Although it is discussed by way of example that state information 301 may be used to track write operations in an online migration, it should be appreciated that other applications may use state information 301 for recovery from interruption or for other reasons. For example, information 301 may be used to track consistency of data in other situations involving mirror processes, or may be used in other applications that track the state of operations performed on storage for other reasons.

For example, state information may be maintained for both online and offline portions of a broken mirror, and the state information can be inspected to identify which data of the online portion of the mirror is to be copied to the offline portion so that the offline and online portions can be resynchronized prior to reconnection. As another example, count 302 may be used to identify data that is more recently written and/or data storage locations that are more frequently written to. This data may be used, for example, by a monitoring process that evaluates writing patterns for the purpose of enhancing storage performance. For instance, data storage locations that are accessed more frequently may be stored in a faster storage device to increase overall storage performance. These examples of the state information 301 are merely illustrative, as other uses are possible. The invention is not limited to any particular implementation.

As discussed above, in one embodiment state information may be maintained by a program executing on host 101. Such a program may be, for example, a program that uses the state information (e.g., a data migration program or mirroring program) or may be a program specially designed to store state information (e.g., like the DELTAMARK control program available from the EMC Corporation). According to one embodiment of the invention, the DELTAMARK control program (or a similar program) may be modified to store information of the type described above (e.g., in FIG. 3). Although the program that stores state information may reside on host 101, it should be appreciated that the program is not limited thereto, and may reside in other areas, such as, for example, a storage system, a router or switch, or any other system.

According to one aspect of the present invention, an online migration program may use state information to track accesses to storage. The program may include three processes: (1) a process that performs a migration of a data set from the source to the target volume, (2) a process that handles writes to the data set during the migration, and (3) an overall process that manages creates and manages the state information and manages processes (1) and (2) above. These processes may be implemented as programs executed in one or more computer systems, such as those discussed below with reference to FIG. 4.

Figure 4:
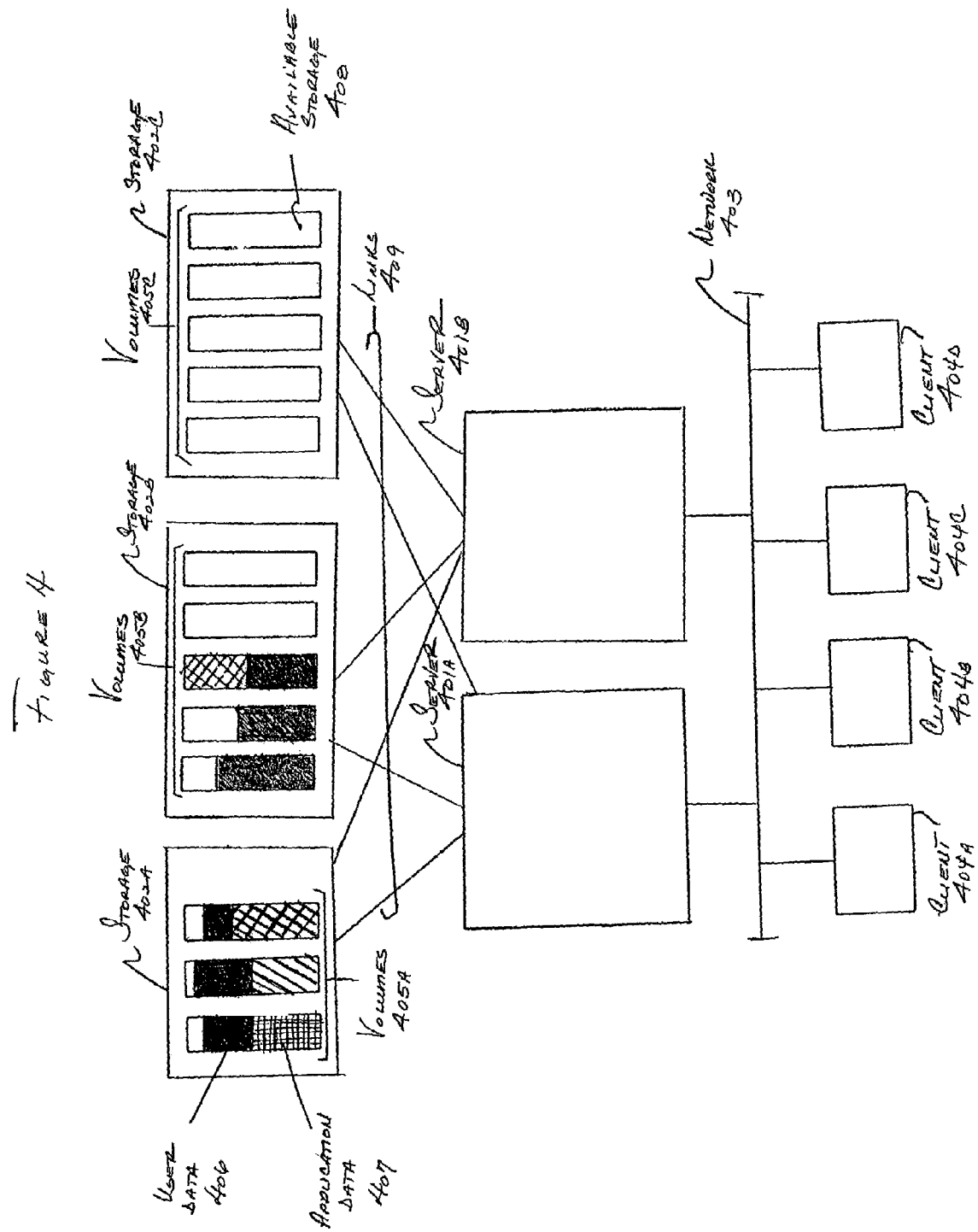
FIG. 4 shows a block diagram of a computer system suitable for incorporation of various aspects of the invention.

Aspects of the present invention may be implemented in computer systems of many different configurations. An example of one such configuration is shown in FIG. 4. It should be appreciated that this is merely an example, as aspects of the present invention can be implemented on computer systems having different configurations. Servers 401A-401B that provide storage services (from storage systems 402A-402C) to one or more clients 404A-404D are generally coupled to servers 401A-401B through a communication network 403. Network 403 may be, for example, Fast Ethernet, Gigabit Ethernet, Fibre Channel, or any other communication medium for communicating information.

As mentioned above, the system configuration shown in FIG. 4 is only an example, as the invention is not limited to use with any particular type of system configuration. For example, the servers need not be connected to the clients over a network; the servers may be directly connected to one or more clients. Also, the servers 401A-401B need not be employed at all, as the clients can be attached (over a network or a direct connection) directly to the storage systems 402A-402C. In such a configuration, the clients may be computer systems (e.g., general-purpose computer systems) that can be adapted to maintain the state of a storage process and/or operation according to various embodiments of the invention as discussed herein.

In the configuration of FIG. 4, each of storage systems 402A-402C may include one or more volumes 405A-405C for storing information. A volume is a storage resource into which a file system, database management system (DBMS), application, or other host resource can store data. A volume can correspond to a physical storage device (e.g., a disk drive) within the storage system, or may correspond to a virtual storage location (e.g., in the case where the storage system is an intelligent storage system that performs a mapping between virtual storage locations and physical storage locations located on one or more media).

Information stored in the volumes may be any information (data, voice information, etc.) capable of being stored on a data storage device. For example, volume 405A may be configured to store user data 406 and application data 407. Servers 401A-401B may be coupled to storage systems 402A-402C by one or more communication links 409, which may be, for example, Fibre Channel, Fast Ethernet, Gigabit Ethernet, or any other type of communication link, network, or group of networks.

Storage systems 402A-402C may be any type of storage system. For example, Symmetrix storage systems available from EMC Corporation of Hopkinton, Mass. may be employed. Servers 401A-401B and/or clients 404A-404D may be, for example, general-purpose (or special-purpose) computer systems configured to provide shared storage resources to one or more clients 404A-404D. Servers 401A-401B may be computer systems having one or more processors (e.g., Pentium processors (available from the Intel Corporation of Santa Clara, Calif.), Althon processor (available from AMD of Sunnyvale, Calif.), UltraSPARC II and III processors (available from Sun Microsystems of Santa Clara, Calif.), PA-RISC, Xeon processors (available from Hewlett-Packard Corporation of Palo Alto, Calif.) or any other processor type) that execute an operating system (e.g., Windows XP, Solaris, Unix, or other type of operating system). Any type of processor and operating system may be used, as the invention is not limited to any particular implementation.

Servers 401A-401B and/or clients 404A-404D may also include memory for storing and executing programs, one or more storage devices (e.g., hard disks) for storing operating system, application and user data, and one or more I/O devices (e.g., keyboard, display, mouse, etc.). Servers 401A-401B and/or clients 404A-404D may also include one or more communication interfaces that allow servers 401A-401B to communicate with storage systems 402A-402C. These interfaces may be, for example, Host Bus Adapters (HBAs) that communicate with storage systems 402A-402C using a communication protocol (e.g., Small Computer Systems Interface (SCSI) protocol, Fibre Channel protocol, or other protocol type).

As discussed above, in one embodiment of the invention, hosts (e.g., servers 401A-401B) may be configured to store state information that allows a state of a data migration operation to be recovered if the migration operation is interrupted. A data migration from one location to another may be performed for any number of reasons. For example, there may be a desire to migrate data from storage system 402A to another storage system because of performance reasons (e.g., storage system 402A is processor bound or approaching its performance limit), or for storage capacity reasons (e.g., storage system 402A may have one or more storage volumes that are full or approaching their capacity.) Therefore, one or more of servers 401A-401B and/or clients 404A-404D may be configured to transfer data (e.g., application data 407, user data 406) to an available storage location, such as available storage location 408 in storage system 402C. Also, there may be a desire to migrate data between two volumes of a single storage system (e.g., any two of volumes 405A of system 402A).

According to one embodiment of the invention, one of the servers 401A-401B and/or clients 404A-404D may execute a program that allows it to migrate data from one storage location to another, and that uses stored state information to resume the migration if it is interrupted prior to completion. According to one embodiment of the invention, the program that performs the migration is executed by, and operates in, an I/O (input/output) stack of the computer (e.g., servers 401A-401B or clients 404A-404D) on which it executes. A process for performing such a migration is described in commonly assigned co-pending U.S. Patent Application entitled METHOD AND APPARATUS FOR MIGRATING DATA, Ser. No. 10/211,469, filed Aug. 2, 2002, which is incorporated herein by reference. It should be appreciated that the aspect of the present invention relating to the use of state information to assist in performing a migration is not limited to use with this particular process, or to implementation in the I/O stack of a computer, as numerous other implementations are possible.

Although it is shown by way of example that various aspects of the invention may be performed in one or more hosts such as servers 401A-401B in FIG. 4, it should be appreciated that the invention is not limited to this particular implementation. For example, various aspects of the invention may be performed by one or more clients, for example, either in a system having the configuration of FIG. 4, or in any other system configuration (e.g., a configuration having no servers and having storage systems directly connected to clients). The present invention is not limited to implementation in any particular way, as numerous implementations are possible.

In accordance with one embodiment of the present invention, the state information is saved in a persistent storage location, such that even if an interruption results from a loss of power, the state information will be retained for use in the recovery process. The persistent storage location can be provided any place in the computer system that is accessible to the host or other device that will implement the recovery process. In one embodiment of the present invention, the state information is stored in the storage systems (e.g., 402A-402C in FIG. 4), as they have persistent storage locations (e.g., disk drives) available. However, it should be appreciated that when the state information is stored on the storage system, the storage system will perform two writes in response to a write operation directed to a storage location on the storage system, i.e., a write that stores the data to its desired storage location and a write that updates the state information. Thus, potential issues can arise relating to the timing of when these two writes are performed, as it would not be desirable to have the state information updated before the data is actually safely stored on the storage system, such that additional complications can arise if the storage system crashes while the state information is being updated.

In view of the foregoing, in accordance with one embodiment of the present invention discussed above, the state information is not stored on the storage system, but is stored elsewhere in the computer system, such as in NVRAM in the host that performs the process (e.g., the data migration in the example discussed above) that performs the write operations. Thus, the host does not update the state information until it receives an acknowledgement from the storage system that the write has completed successfully. It should be appreciated, however, that the present invention is not limited in this respect, and that the state information can be provided in any location in the computer system that is accessible to the processor that will perform the recovery process.

Figure 5:
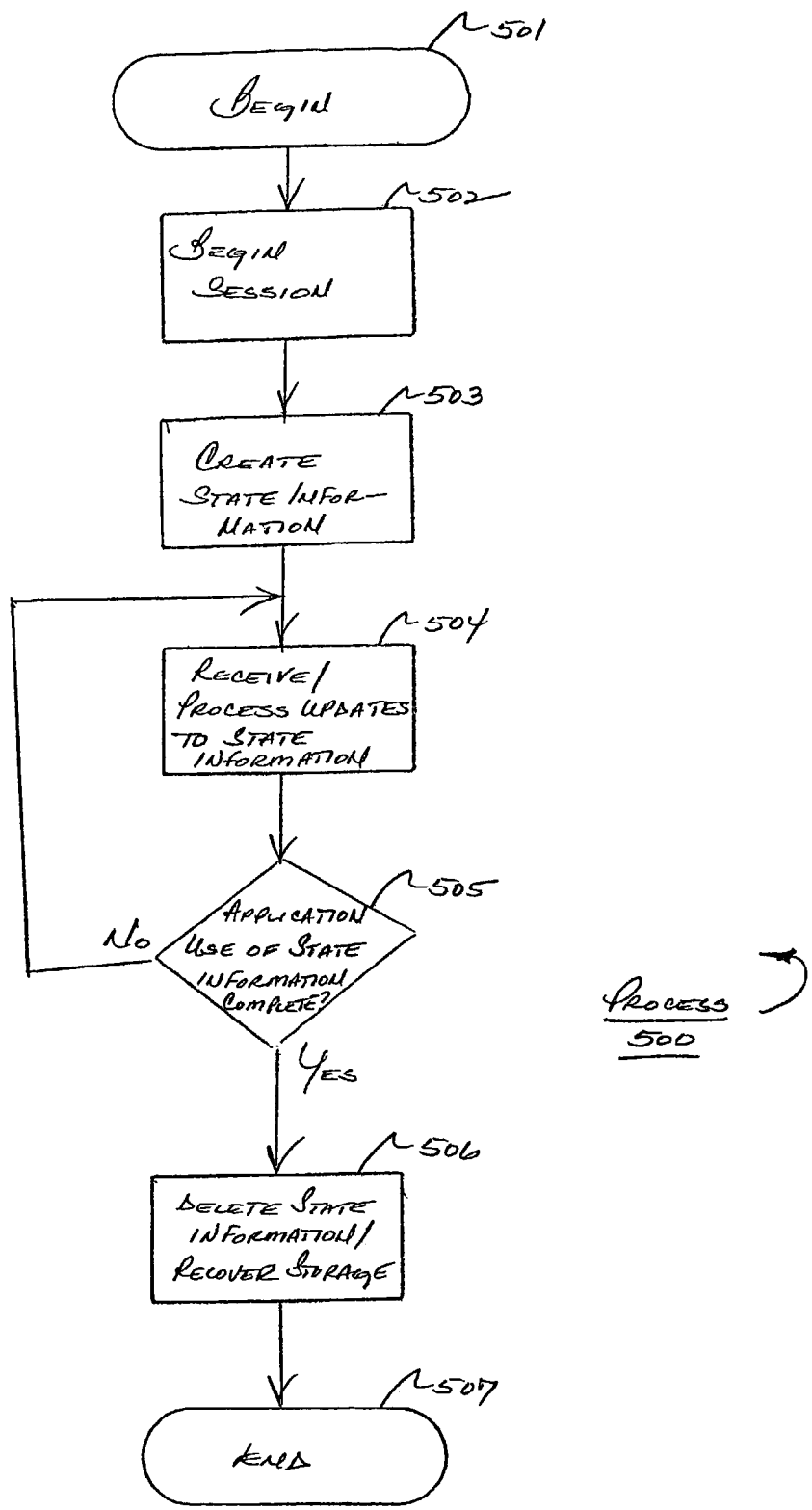
FIG. 5 shows a process for maintaining state information of an operation according to one embodiment of the invention.

FIG. 5 shows a process 500 for maintaining state information according to one embodiment of the invention. At block 501, process 500 begins. At block 502, a session is begun in which the state of one or more storage locations is tracked using state information. At block 503, state information is created. In one embodiment, the state information may be a reference indicator (e.g., a count) indicating storage operations performed on one or more storage locations. In the case of maintaining a count of data storage operations performed on a particular data storage location, an initial count (e.g., zero) may be stored as initial value of the reference indicator.

At block 504, the process receives and processes updates to the state information. These updates may be, for example, produced by changes made in the data (e.g., as a result of write operations) or accesses (e.g., read or write operations) performed on data stored in the data storage location being tracked. At block 505, it is determined whether the use of the state information is complete. For example, in the embodiment where the state information is used to track the state of storage operations performed by a data migration application, the use of the state information may be completed when the migration of the portion of the data set corresponding to the state information created at block 503 is complete. When the use of the state information is complete, the state information is deleted at block 506, and the process terminates at block 507.

Optionally, the host may recover the storage used for tracking the state of a storage process performed on a particular set of locations and may reuse that storage for tracking the state of another storage process. In this manner, the host may minimize the amount of storage used to track the state of storage processes. This is useful, for example, where the state information is stored in an NVRAM device, and the amount of storage available in the NVRAM device is limited, so that it is beneficial to minimize the amount of space used for tracking state information. Of course, minimizing the storage space used to store state information may be useful when the state information is not stored in NVRAM. Thus, it may be desirable to track only storage operations while they are being performed. Alternatively, although conserving storage space is desirable, the present invention is not limited to employing any particular conservation technique, or to taking any action at all to conserve storage space.

In one embodiment, a "window" set of state information may be created and stored to track the state of storage locations subject to active storage operations. This window may be adjusted from time to time to remove state information relating to storage locations that are no longer subject to active storage operations (e.g., locations for which operations have completed). In this manner, memory requirements for storing state information for a relatively larger set of storage locations are reduced, while the storage operation(s) being performed to that larger set are still protected.

In the online migration example discussed above, a window of state information may be stored for storage locations subject to active write operations during the migration process. In particular, state information may be created that tracks the state of data stored in storage locations of the source and target volumes, and when a process (e.g., a mirror process) that performs writes to both storage locations of the source and target volumes completes, the storage resource used to create the window of state information may be reused to track the state of operations (e.g., subsequent write operations) to different storage locations.

In one embodiment, multiple "windows" may exist at any one point in time depending on the number of concurrent operations pending. For example, one or more windows may be constructed that track the states of different storage locations on both the source and target volumes that are subject to write operations performed by a mirroring process.

In addition to the above-described state information which can be maintained to track the state of write operations to a data set being migrated, one embodiment of the present invention also includes additional state information that stores an overall state of the migration process, so that if the migration process is interrupted, it can resume without going back to the beginning of the data set and recopying storage locations that have already been successfully copied. This state information concerning the overall migration process can be implemented in any of numerous ways, as the present invention is not limited to any particular implementation technique. For example, checkpoints can be used, as described in commonly assigned co-pending U.S. Patent Application entitled METHOD AND APPARATUS FOR MIGRATING DATA, Ser. No. 10/211,469, filed Aug. 2, 2002, which is incorporated herein by reference.

In an alternate embodiment of the invention, rather than using a fixed checkpoint to track the progress of the overall migration process, windows, such as those discussed above, can be created for areas of the data being migrated. By doing so, the areas of the data set actively being migrated will be protected in the event of an interruption during a pending write operation to the area of the data set, in the manner discussed above. In addition, the boundaries of the window, which can be moved as migration of the areas are completed, can serve the same function as the checkpoint described in the above-referenced application, in a manner discussed in more detail below.

In an online migration, either a "physical" migration or "logical" migration of data may be performed, and windows of state information may be constructed based on the type of migration. A physical migration may be performed between a source volume and target volume wherein a physical segment of data of the source volume is migrated to the target volume. For instance, a migration of blocks 2000 through 10000 of a source volume may be migrated to a location (e.g., blocks 4000 through 12000) of a target volume. In this case, separate windows may be created for the source volume and for the target volumes that track the state of storage locations within the segment of storage to migrated (e.g., block range 2000-2999 of the segment located on the source volume) and the destination segment (e.g., block range 4000-4999 of the target volume), respectively. When data located in that area has been copied, the windows may be "moved" to track the next area of storage to be migrated (e.g., block range 3000-3999 of the source volume and 5000-5999 of the target volume). For write operations performed on data already migrated, small windows of state information may be constructed as discussed above to track the state of the write operation to be performed. Using the example above, if a write operation were to be applied to a previously-migrated block 2002 of the source volume which corresponds to a block 4002 of the target volume (data was previously migrated from block 2002 of the source volume to block 4002 of the target volume), state information may be dynamically created to track accesses to both of these blocks. After the write operation to a location already migrated is successfully applied to both the source and target volumes, the windows of state information created for that write operation may be deleted.

In accordance with one embodiment of the present invention, separate windows are not created to protect write operations directed to data locations that have not yet been migrated. The reason for this is that even if the source and target locations might temporarily store inconsistent data as a result of an interruption of the process during the pendency of a write operation, as the overall migration process progresses, the data in the source location will eventually be copied to the target location, such that these locations will be consistent at the end of the migration process. Of course, it should be appreciated that the present invention is not limited in this respect, and that steps can also be taken to protect write operations directed to storage locations that have not yet been migrated.

A logical migration may be performed between a source volume and target volume wherein a logical entity (e.g., a directory, group of files) of the source volume is migrated to the target volume. For instance, files X, Y, and Z may be migrated to the target volume. In this case, a window may be created that tracks the state of storage locations corresponding to the logical entity being migrated. For example, when migrating the file X, a window may be created that stores state information that corresponds to storage locations of the source volume that store portions of file X. These storage locations may be contiguous locations within the source volume or may be a group of non-contiguous storage locations (e.g., blocks 2000-2005, 3007, 4001-4016 of the source volume). A window may also be created for the target volume segment(s) to which file X is to be migrated.

If a write needs to be applied to a logical entity previously migrated (e.g., a file X), a window may be created for X for both the source and target storage locations for file X, and may be maintained until the write operation is complete. If a write is applied to a file not yet migrated, the write need only be applied to the source volume, and state information need not be maintained.

Figure 6:
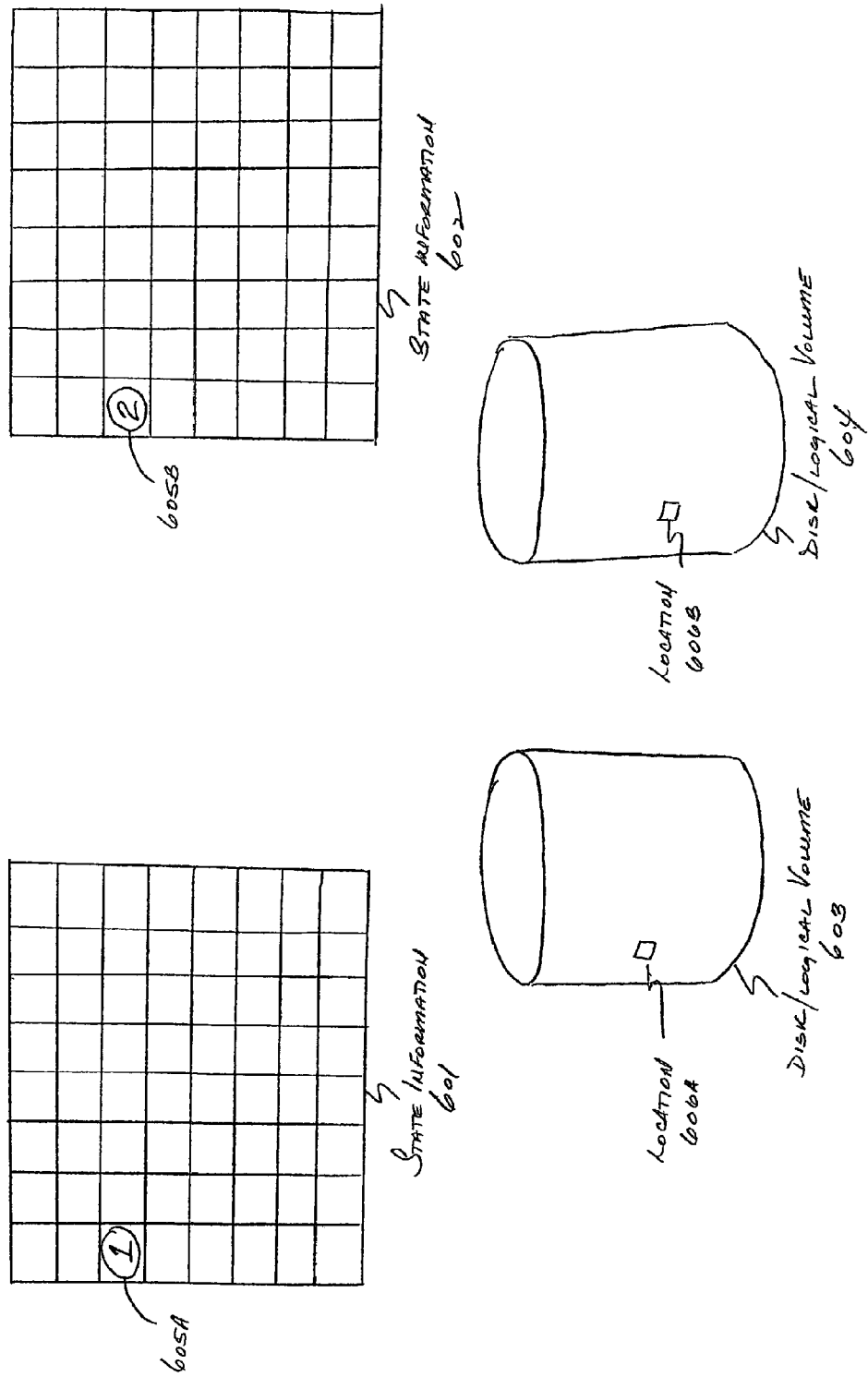
FIG. 6 shows the use of a counter for maintaining state information of an operation according to one embodiment of the invention.

FIG. 6 shows one example use of state information according to one embodiment of the invention in connection with a mirroring application. As discussed above, in a mirroring operation wherein the same data is written to two different storage locations, it may be desirable to use state information of the write operations to determine whether the data stored at these locations is consistent in the event of a failure during a pending write operation.

In FIG. 6, state information 601 tracks the state of data storage operations performed on a portion of a disk/logical volume 603, and state information 602 tracks state changes in a portion of a disk/logical volume 604. State information 601 and 602 may be similar in nature to state information 301 described above. As write operations are performed to volumes 603, 604, the corresponding state information 601, 602 is updated. As discussed above, state information 601 may include a count 605A of the number of write operations performed on a particular data storage location of volume 603. Similarly, state information 602 may include a count 605B of the number of write operations performed on a data storage location of volume 604.

In a mirroring operation, a write may be applied to two or more data storage locations (e.g., location 606A of volume 603 and location 606B of volume 604). These counts 605A, 605B may be incremented, for example, after a write operation is performed on their respective data storage locations, e.g., when the state information is updated by a computer that issues the writes (e.g., a host or client in FIG. 4), the state information can be updated after receiving an acknowledgement that the write operation is complete.

In the event of a failure, counts 605A and 605B may be compared to determine, for example, whether a write operation was applied to both locations, to ensure consistency. For example, when a mirroring operation creates a mirror between two storage locations 606A, 606B, one would expect the state information 605A, 605B tracking the storage operations to be the same. However, in the case of a failure that causes an interruption during a pending write operation, the write operation may be performed to neither storage location, only one of the storage locations (causing an inconsistency), or both of the storage locations.

To recover from such an interruption, it may be beneficial to determine whether the storage locations store consistent data. Such a determination may be made, for example, by comparing counts 605A and 605B. If, after the comparison, it is determined that more write operations were performed to one of the data locations, the data in the two locations may be inconsistent. When a potential inconsistency is discovered, in one embodiment of the invention steps are taken to address it. As discussed above, when a data inconsistency is discovered, the data stored at both locations may be treated as invalid, or the more recent data may be treated as good data and copied to the other location.

Figure 7:
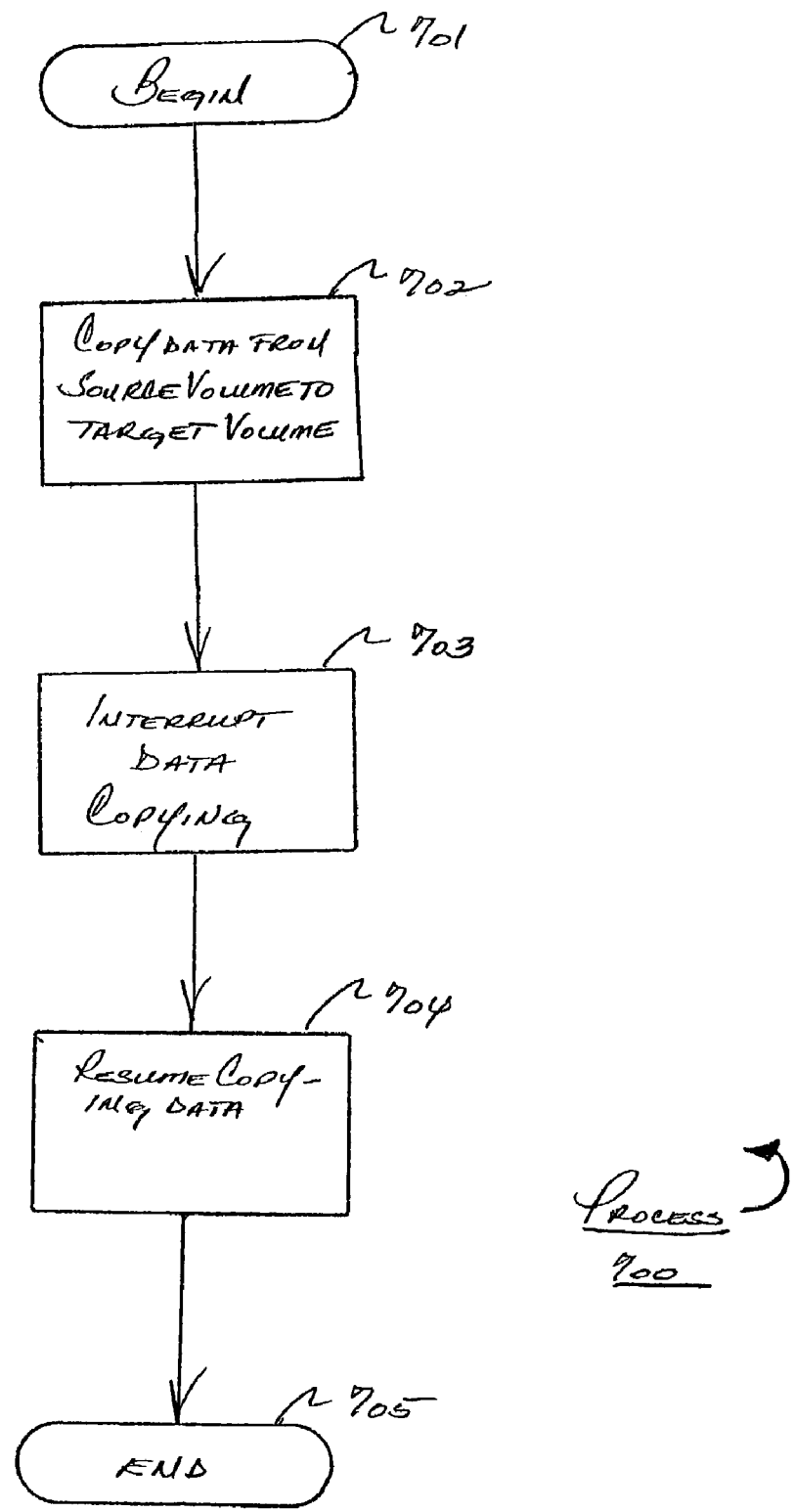
FIG. 7 shows a process for migrating data according to one embodiment of the invention.

As discussed above, various aspects of the invention may be used to allow a migration program to recover its state upon an interruption, so that it need not go back to the beginning. FIG. 7 shows a process for migrating data according to one embodiment of the invention.

At block 701, process 700 begins. At block 702, the migration process begins copying data from at least one source volume to at least one target volume. The migration process issues read requests from the source volume and write requests to the target volume to perform the copy. As discussed above, these volumes may be located on the same or different storage systems. This copy process may be a primary process executing in a host performing the migration (e.g., in a server 401A in FIG. 4), or may be configured as a background process executing in the host.

As discussed in more detail below, in one embodiment of this migration process, the state of the copy process is stored in a persistent data location. This location may be, for example, located on the source or target volume of the migration, in non-volatile memory on the host, or elsewhere in the computer system. For example, state information may be stored after, for example, a storage operation is performed.

At block 703, the copying process is interrupted by, for example, a server crash or other situation that causes loss of volatile state data for the migration process.

Because state information is stored in a persistent data location, the migration process is able to resume copying data at block 704 based upon a saved state of the migration process in a manner described below. Thus, the data already copied need not be re-copied, which enables the migration process to be completed more quickly. At block 705, process 700 ends.

The process of FIG. 7 can be implemented in any of numerous ways, as the present invention is not limited to any particular implementation.

According to one embodiment, the migration process may resume copying by retrieving information identifying the state of the copy process prior to the interruption. As discussed above, the state of the copy process may be tracked using state information that indicates whether copying of particular locations has been completed. If the migration is a physical migration, a lower bound of a window may (although other techniques are possible) serve to indicate where the last successful copy of the migration occurred. In the example discussed above wherein a window is constructed from blocks 3000-3999 to track the state of the migration of these blocks, and the migration process is interrupted, the migration process may be resumed from block 3000, as it may be assumed that prior blocks 2000-2999 were successfully migrated. The copy process then can resume by beginning copying at the storage location (or logical entity) where the previous copy process left off.

In the case of a logical migration where a number of entities are migrated, state information may be stored that indicates the last successful entity successfully migrated. An order may be created for the entities to be migrated such that if an interruption occurs in the migration, the migration process may recover state by identifying the last successful entity transferred. In the example discussed above, if the order of migration of files X, Y, Z is alphabetical, and the migration process is interrupted while transferring file Y, then the process may resume migrating file Y, as file X was successfully migrated.

According to one embodiment of the invention, the source volume(s) being migrated are maintained online (i.e., readable and writeable by application programs), so that writes may occur to the source volume(s) during the migration. To support that embodiment, the migration process may be configured to apply write operations directed to the source volume(s) to both the source and target volume(s) during the migration process. In this manner, updates of data already migrated are performed to the target volume(s) to ensure that when the migration is complete, the target volume(s) are up-to-date with the source volume(s).

This update may be accomplished by, for example, a program that executes in an I/O stack of the host and is configured to apply write operations to one or more volumes of data. Such a program may be implemented, for example, in a filter driver adapted to perform mirroring and/or data migration functions. Such a filter driver is described in commonly assigned co-pending U.S. Patent Application entitled METHOD AND APPARATUS FOR MIGRATING DATA, Ser. No. 10/211,469, filed Aug. 2, 2002, which is incorporated by reference herein. However, it should be appreciated that the present invention is not limited to this particular implementation, as the updating function may be implemented in other ways.

A filter driver is commonly inserted into the I/O stack of a computer to perform a particular service or function involving data that traverses the stack. One example of a filter driver is the PowerPath driver available from the EMC Corporation, which has numerous capabilities, including the ability to perform path selection in a multi-path system wherein multiple paths extending between the host and the storage system can be used to access one or more logical volumes. According to one embodiment of the invention, a filter driver, of which the PowerPath filter driver is only one example, may be employed to perform reads and writes from/to source and target logical volumes to support data migration.

According to one embodiment of the invention, state information is used to "protect" the whole data set being migrated, so that the process can recover from a failure during a pending write operation to any portion of the data set. However, the data set to be migrated may be large, and it may not be feasible or desirable to maintain state information for the entire data set at any one point in time. To save storage space, in one embodiment, only the portions of the data set where writes are occurring is protected at any point in time.

In the case of an online migration operation, the online migration may include (1) a copy operation from the source volume to the target volume and (2) a mirroring operation where writes are applied to both the source and target volumes. In addition, in accordance with one embodiment of the invention, to protect the integrity of the data involved in the online migration, state information may be maintained that relates to the storage locations being updated as discussed above.

As mentioned above, in another embodiment of the invention, a technique is provided to enable an interrupted migration to be resumed without going back to the beginning. This can be done in any of numerous ways, as this aspect of the invention is not limited to any particular implementation technique. As discussed above, in one exemplary implementation, the migration program is configured to store state information indicating portions of the data set being migrated for which a successful copy of the portion to the target volume has been achieved. More particularly, the migration program may, during the migration process, store state information in a persistent manner that allows the host on which the migration program is being executed (e.g., server 401A) to continue the migration after an interruption, in a manner discussed above. Because the host can restore the state of the migration, the host can avoid restarting the migration from the beginning if it is interrupted. State information may be stored, for example, in a source or destination volume, or in any other persistent location (e.g., in a memory such as an NVRAM device on a local disk of server 401A), as the invention is not limited to any particular implementation.

According to one aspect of the invention discussed above, additional state information may be maintained for at least portions of the data set to be migrated in which active write operations are being performed. For example, as discussed above, in one embodiment of an online migration from the source to target volume, a write operation to a storage location is applied to both the source and target locations as data is copied from the source to the target. In this embodiment, before the write operation is applied, state information is created that tracks the state of data stored in the data location (s) that is/are the object(s) of the write request (e.g., the data storage locations of the source and target volumes). In this manner, the state of the write operation is maintained in case an interruption occurs while the write operation is being performed. As discussed above, this state information may be, for example, a count of data operations performed on the data storage location as described above.

Figure 8:
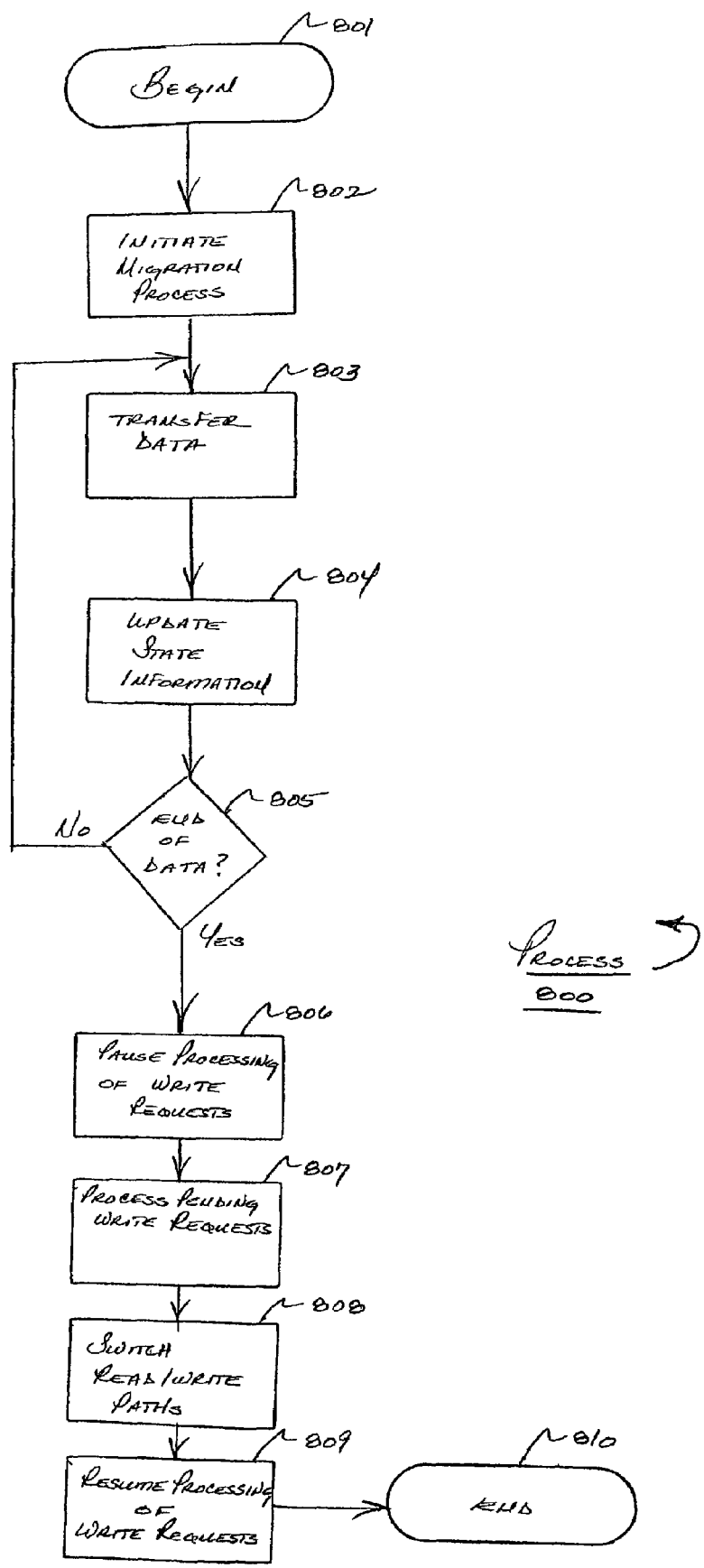
FIG. 8 is a process for migrating data according to another embodiment of the invention.

One illustrative implementation of the copy process performed at block 702 (FIG. 7) is shown in FIG. 8, which shows an illustrative process 800 for migrating data according to one embodiment of the invention. Process 800 is one embodiment of a migration process that can tolerate an interruption, and then resume the migration without restarting at the beginning as discussed above. Process 800 can also be used to resume the migration (block 704), so long as prior to resuming the copy process at block 802, the previously-saved state is retrieved to determine the point at which the migration process should resume.

At block 801, process 800 begins. At block 802, the copy process is initiated to copy the data set from the source volume(s) to the target volume(s). At block 803, data is transferred to the target volume. As data locations on the target volume are written to as part of the data migration process, state information that serves as an indicator of the progress of the migration is updated at block 804. If the migration process is interrupted, the indicator may be inspected to determine where the migration should resume. For instance, if an indicator is stored that indicates that a storage location of the source volume has been successfully migrated, then the migration process may resume without recopying that portion of data. The indicator may be any information that indicates that a particular data segment has been transferred, including a moving window as discussed above, a checkpoint as described in commonly assigned co-pending U.S. Patent Application entitled METHOD AND APPARATUS FOR MIGRATING DATA, Ser. No. 10/211,469, filed Aug. 2, 2002, or any other suitable information.

When performing a "physical" migration in which the state of the migration is tracked using the moving window technique discussed above, the indicator may be a beginning of a data segment of the source volume currently being migrated. That is, in an ordered migration of physical blocks from a source volume to a target volume, and wherein a window of state information is created for a segment of storage currently being copied, it may be assumed that previous segments (in the order) were transferred successfully. If the migration process is interrupted, the migration process may be resumed at the segment on which the process was interrupted, without having to migrate the previous segments. In one embodiment, the beginning of the current segment is indicated by the trailing edge of the window. For instance, in the physical migration example described above, if an interruption occurs when actively migrating blocks 3000-3999 of the source volume, the migration process may be resumed at block 3000, as it may be assumed that blocks 2000-2999 were successfully migrated. In this manner, the number of storage operations is reduced as blocks 2000-2999 need not be migrated.

In an alternate embodiment, an additional indicator that indicates the progress of the migration within the window also may be saved to a non-volatile storage location (e.g., NVRAM). This indicator may serve to more particularly indicate within the window where the migration may be resumed (e.g., the last block of the current segment that was successfully migrated), and therefore, may further reduce the number of operations that need to be re-performed.

When performing a "logical" migration, the indicator may be data that identifies the current entity being transferred. That is, in an ordered migration of logical entities from a source volume to a target volume, and wherein a window of state information is created to track operations performed on a logical entity being migrated, it may be assumed that entities previous (in the order) to the current entity being transferred were transferred successfully. If the migration process is interrupted, the migration process may be resumed on the entity on which the process was interrupted without having to migrate previous entities. For instance, in the logical migration described above, if an interruption occurs when migrating file Y of the source volume, it may be assumed that file X, which precedes file Y in the order of migration, was successfully migrated.

In an alternate embodiment, an additional indicator may be stored that indicates the progress of the migration within the logical entity currently being migrated. For example, if file Y includes data stored in blocks 2000-2005, 3007, 4001-4016 of the source volume (and migrated in numerical order), and the last block successfully transferred was block 4008, an indicator may be stored that identifies block 4008. The migration may be resumed at the block following the last successfully-transferred block, and thus the number of operations to be re-performed may be further reduced.

At block 805, a determination is made as to whether the end of the data set being migrated is reached. If not, the process returns to block 803 to continue the data transfer. When it is determined at block 805 that the end of the data being migrated is reached, the process(es) pauses processing of any new write requests at block 806 by making the volume(s) temporarily unavailable to applications, hosts, and clients. The process then flushes the I/O queue by processing any pending write requests at block 807.

At block 808, the process switches read/write paths to direct new read and write requests to the new location of the data (e.g., the target volume(s)). This can be performed in any of numerous ways, as the present invention is not limited to any particular switching technique. For example, appropriate entities on the host (e.g., a file system and/or a logical volume manager (LVM) of the host) can be reconfigured to access the new target volume(s). Alternatively, in accordance with one embodiment of the invention, the switch can be performed without requiring reconfiguration of the host. A technique for performing such a switch is described in commonly assigned co-pending U.S. application Ser. No. 10/122,566, entitled METHOD AND APPARATUS FOR MANAGING ACCESS TO VOLUMES OF STORAGE, which is incorporated herein by reference. As described therein, a switch to a target volume can be performed by a filter driver (e.g., a migration layer) that can intercept I/O requests directed to a source volume and redirect them to a target volume in a manner that is transparent to higher level layers in the host (e.g., the applications, file system layer and LVM).

After the read/write paths are switched, the processor resumes processing of write requests (redirected to the target volume(s)) at block 809 so that all read and write requests are sent to the target volume(s). At block 810, process 800 ends.

As discussed above, a storage process (e.g., a migration process) may be configured to resume operation upon experiencing an interruption. The storage process, when started from an interrupted state, may determine that it has been interrupted and may perform a recovery process to determine its state prior to the interruption.

A recovery process according to one embodiment may determine which I/O operations were pending, and ensure that no pending I/O resulted in data that is inconsistent on the source and target volumes. Because data is verified as being consistent and, if necessary, placed in a consistent state, the operations performed during recovery can be minimized. For example, in the commonly-assigned co-pending U.S. Patent Application entitled METHOD AND APPARATUS FOR MIGRATING DATA, Ser. No. 10/211,469, filed Aug. 2, 2002, a recovery technique is employed that writes to the target all data read from the source during recovery to ensure that the data is consistent between them. For locations where the data is already consistent, this results in unnecessary write operations. According to one embodiment, the ability to determine whether data is consistent obviates the need to perform writes to the target for read operations during recovery, thereby eliminating unnecessary write operations during recovery.

Figure 10:
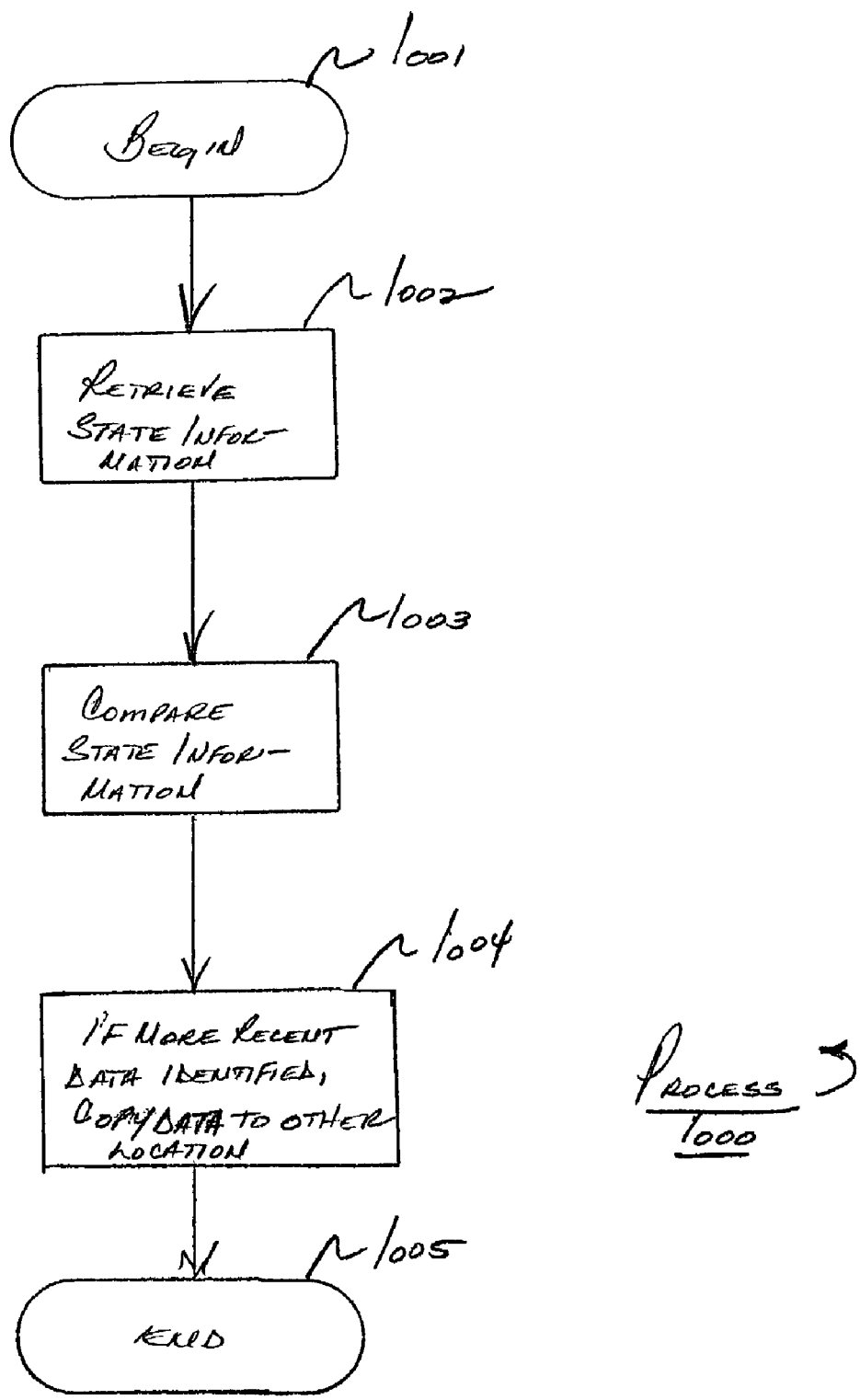
FIG. 10 shows a recovery process according to one embodiment of the invention.

One illustrative recovery process 1000 for addressing pending write operations when failure occurs is shown in FIG. 10. This recovery process ensures that the interruption of a pending write operation does not lead to inconsistent data in source and target volumes as discussed above with respect to FIG. 9.

At block 1001, process 1000 begins. At block 1002, state information created for storage locations where write operations were pending at the time of the interruption is retrieved and inspected. As discussed, this state information may be a count of the number of write operations performed on particular data storage locations. At block 1003, state information associated with the source and target volumes is compared to determine if the storage locations on the source and target volumes hold inconsistent data. If so, steps are taken (at block 1004) to ensure consistency. As discussed above, in one embodiment, the more recent data is copied to the other storage location. However, other methods for maintaining consistency may be used (e.g., invalidating both the source and target locations).

At block 1005, process 1000 ends.

As discussed above, state information that tracks I/O operations performed on storage locations may have uses other than the aforementioned online migration application. For example, state information that tracks the state of I/O operations may be useful in monitoring storage operations performed on a particular data storage location, or in tracking access to particular data. The nature of the state information maintained may vary according to the needs of the application that uses the state information.

Figure 11:
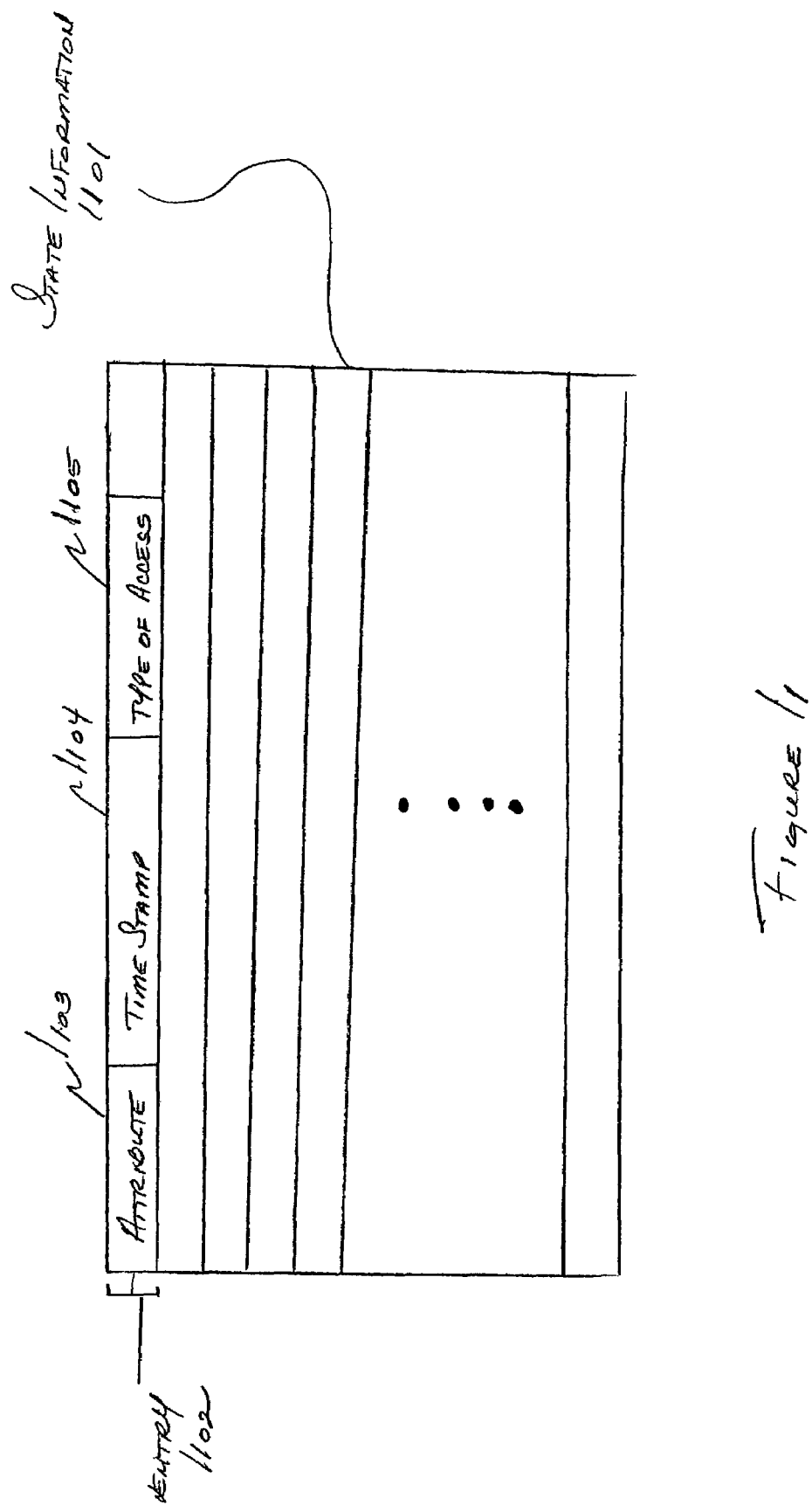
FIG. 11 is a table showing an alternative data format for storing state information according to one embodiment of the invention.

FIG. 11 shows an alternative data format of state information 1101 according to one embodiment of the invention. Similar to state information 301 above, state information 1101 may include, for example, one or more entries 102 related to particular storage locations. In this embodiment, however, time stamp information may replace count information, the time stamp information indicating when data stored at the particular storage location was accessed.

State information 1101 may be stored, for example, as a log of multiple entries (as discussed below), or may be stored in a single entry corresponding to the most recently-performed transaction. The state information 1101 may be stored in a memory of a host (e.g., host 101), or in any location accessible to the host.

The embodiment in FIG. 11 may be used to determine whether data stored in locations of source and target volumes are consistent as part of an online migration process as discussed above with respect to FIG. 10. For example, if a write operation applied to both the source and target locations occurs at the same time or within an acceptable time window of each other, it may be determined that the write operation was successfully applied to both locations. However, if the state information indicates that a write occurred at a particular time to only one of the source and target locations, this can provide an indication that the data stored therein may be inconsistent.

It should be appreciated that time stamp information may be used for purposes other than an online migration, as the invention is not limited to any particular use of time stamp information. For example, time stamp information may be used by an administrator of a storage system being accessed to observe access patterns. Also, other programs and/or systems may use time stamp information in any other manner (e.g., to identify more frequently-accessed storage locations, or to identify storage locations that are accessed at particular times of the day).

Time stamp information may be maintained over a given period of time, and may not be limited to being maintained during execution of a particular program. Further, time stamp information may be made available to multiple processes or systems. That is, time stamp need not be limited to being accessed by a single process (e.g., a migration process), application, or system. Time stamp information may be made available to many different entities for different purposes.

An entry 1102 may include one or more attributes 1103 that characterize an I/O operation performed on data stored at the particular storage location. For instance, there may be an attribute 1104 which is a time stamp indicating the time (e.g., host system time) at which an I/O operation was performed. Further, an entry 1102 may include an attribute 1105 indicating the type of access (e.g., read, write) performed on that particular location. In one embodiment, these entries may be maintained only for active storage operations, and therefore, storage requirements for such entries may be minimized. The state information of FIG. 11 may be used, as discussed above, by an administrator, program, or system to monitor/analyze storage systems or applications that perform data storage operations. Although several attributes of an entry are described above, the invention may include more, less, or different types of attributes, and the invention is not limited to any particular implementation.

The above-described embodiments of the present invention can be implemented in any of numerous ways. For example, the above-discussed functionality for storing state information can be implemented using hardware, software or a combination thereof. When implemented in software, the software code can be executed on any suitable processor. It should further be appreciated that any single component or collection of multiple components of the computer system that perform the functions described above can be generically considered as one or more controllers that control the above-discussed functions. The one or more controllers can be implemented in numerous ways, such as with dedicated hardware, or using a processor that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on the host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in an online migration performed on a computer system including at least one storage system that stores data written by at least one computer in the computer system, wherein the at least one computer executes instructions that perform at least one storage process that performs a write operation that writes the same data to first and second data storage locations in the at least one storage system while the computer system simultaneously performs a migration process which migrates data from a source which comprises the first data storage location to a target which comprises the second data storage location, the method comprising acts of:
   (A) in response to the migration process being interrupted during the write operation, determining whether data stored in the first data storage location and the second data storage location are consistent; and
   (B) in response to determining that the data stored in the first data storage location and the second data storage location are consistent, resuming the migration process.

2. The method according to claim 1, wherein the computer system maintains a first count of one or more storage operations performed on the first data storage location and maintains a second count of one or more storage operations performed on the second data storage location, and wherein the act of determining comprises an act of comparing the first count and the second count to determine whether the data are consistent.

3. The method according to claim 1, wherein the computer system maintains first time stamp information identifying when one or more storage operations were performed on the first data storage location and maintains second time stamp information identifying when one or more storage operations were performed on the second data storage location, and wherein the act of determining comprises an act of comparing the first time stamp information and the second time stamp information to determine whether the data are consistent.

4. The method according to claim 1, further comprising an act of:
   (C) in response to determining that the data stored in the first and second data storage locations are not consistent, making the data stored in the first data storage location and the second data storage location consistent.

5. The method according to claim 4, wherein the act of making further comprises acts of determining which one of the first and second data storage locations stores more recent data, and copying the more recent data to the other data storage location.

6. The method according to claim 4, wherein the act of making further comprises an act of invalidating the data stored in the first and second data storage locations.

7. The method according to claim 1, wherein the act of determining includes an act of retrieving an indication of a state of the first and second storage locations.

8. The method according to claim 7, wherein the act of retrieving includes an act of retrieving the indication from a non-volatile memory of the at least one computer.

9. The method according to claim 7, wherein the at least one computer is a server and wherein the act of retrieving includes retrieving the indication from a non-volatile memory of the server.

10. A computer readable medium encoded with instructions for execution on a computer system, the instructions, when executed, perform a method for use in an online migration performed on the computer system including at least one storage system that stores data written by at least one computer in the computer system, wherein the at least one computer executes instructions that perform at least one storage process that performs a write operation that writes the same data to first and second data storage locations in the at least one storage system while the computer system simultaneously performs a migration process which migrates data from a source which comprises the first data storage location to a target which comprises the second data storage location, the method comprising acts of:
   (A) in response to the migration process being interrupted during the write operation, determining whether data stored in the first data storage location and the second data storage location are consistent; and
   (B) in response to determining that the data stored in the first data storage location and the second data storage location are consistent, resuming the migration process.

11. The computer readable medium according to claim 10, wherein the computer system maintains a first count of one or more storage operations performed on the first data storage location and maintains a second count of one or more storage operations performed on the second data storage location, and wherein the act of determining comprises an act of comparing the first count and the second count to determine whether the data are consistent.

12. The computer readable medium according to claim 10, wherein the computer system maintains first time stamp information identifying when one or more storage operations were performed on the first data storage location and maintains second time stamp information identifying when one or more storage operations were performed on the second data storage location, and wherein the act of determining comprises an act of comparing the first time stamp information and the second time stamp information to determine whether the data are consistent.

13. The computer readable medium according to claim 12, wherein the method further comprises an act of:
   (C) in response to determining that the data stored in the first and second data storage locations are not consistent, making the data stored in the first data storage location and the second data storage location consistent.

14. The computer readable medium according to claim 13, wherein the act of making further comprises acts of determining which of the first and second data storage locations stores more recent data, and copying the more recent data to the other data storage location.

15. The computer readable medium according to claim 13, wherein the act of making further comprises an act of invalidating the data stored in the first and second data storage locations.

16. The computer readable medium according to claim 10, wherein the act of determining includes act of retrieving an indication of a state of the first and second storage locations.

17. The computer readable medium according to claim 16, wherein the act of retrieving includes an act of retrieving the indication from a non-volatile memory of the at least one computer.

18. The computer readable medium according to claim 16, wherein the at least one computer is a server and wherein the act of retrieving includes retrieving the indication from a non-volatile memory of the server.

* * * * *